United States Patent Office 3,133,974
Patented May 19, 1964

3,133,974
PHENOL ALKYLATION PROCESS
Robert P. Curry and James C. Geddes, Jr., Baton Rouge, La., assignors to Ethyl Corporation, New York, N.Y., a corporation of Virginia
No Drawing. Filed Nov. 23, 1960, Ser. No. 71,163
12 Claims. (Cl. 260—624)

This invention relates to a novel low temperature process for the simultaneous preparation of ortho alkyl phenols, 2,4-dialkyl phenols and 2,6-dialkyl phenols. More particularly, this invention relates to a novel low temperature process for the conjoint production of substantial quantities of ortho-tert-butyl phenol, 2,4-di-tert-butyl phenol and 2,6-di-tert-butyl phenol.

Of the various known alkylated phenols, ortho-tert-butyl phenol, 2,4-di-tert-butyl phenol and 2,6-di-tert-butyl phenol are particularly valuable in the chemical and allied arts. By way of example, 2,6-di-tert-butyl phenol is extensively used commercially as an antioxidant and as a necessary ingredient in the preparation of 4,4'-methylene bis-2,6-di-tert-butyl phenol, a superlative antioxidant for lubricating oils and other oxygen-sensitive organic media (U.S. Patents 2,944,086; 2,807,653). Similarly, 2,4-di-tert-butyl phenol is the essential raw material for the production of 2,2'-methylene bis-2,4-di-tert-butyl phenol, another important antioxidant (U.S. Patents 2,807,653; 2,758,032). By the same token, ortho-tert-butyl phenol is an exceedingly valuable chemical intermediate, e.g. for use in the production of novel phenol-formaldehyde resins of unique properties.

Current commercial activities have imposed a demand for a process which can efficiently, effectively and conjointly produce these three tertiary butylated phenols from phenol and isobutylene. However, the provision of such a process is complicated by the facts that the process to fulfill this demand must not require high temperatures and must not produce an overabundance of 2,4,6-tri-tert-butyl phenol. Even temperatures as high as 180–200° C. in such a process are very undesirable in that dealkylation and rearrangement of the tertiary butyl phenols may be encountered. Furthermore the need to supply heat sufficient to raise large quantities of reactants to such elevated temperatures in a commercial installation significantly increases the cost of the process and the consequent products. The compound 2,4,6-tri-tert-butyl phenol which is readily formed when phenol is alkylated with isobutylene is a millstone because there is no particular present commercial outlet for this material and it cannot be economically converted back into the above three desired, commercially important tertiary butyl phenols. Therefore, the conversion of phenol into 2,4,6-tri-tert-butyl phenol represents a distinct waste, both of valuable raw materials and of throughput in a commercial operation. As a consequence, there is a distinct need in the art for a low temperature process whereby phenol and isobutylene can be selectively converted into significant quantities of ortho-tert-butyl phenol, 2,4-di-tert-butyl phenol and 2,6-di-tert-butyl phenol without the formation of excessive quantities of 2,4,6-tri-tert-butyl phenol.

Accordingly, an object of this invention is to fulfill the foregoing need. More particularly, an object of this invention is to provide a low temperature process whereby ortho-tert-butyl phenol, 2,4-di-tert-butyl phenol and 2,6-di-tert-butyl phenol are concurrently formed in significant quantities without incurring the formation of an inordinately high amount of 2,4,6-tri-tert-butyl phenol. Other objects will become apparent from the ensuing description and claims.

The above and other objects have now been accomplished in a very effective, efficient and economical manner by the process of this invention. We have discovered that by subjecting a reaction mixture composed of phenol, isobutylene, an aluminum phenoxide catalyst and a hereinafter-defined halogen compound to a temperature of from about 120 to about 160° C. and a pressure of from about 100 to about 900 p.s.i.g., an efficient simultaneous conversion to ortho-tert-butyl phenol, 2,4-di-tert-butyl phenol and 2,6-di-tert-butyl phenol is accomplished, while at the same time, the coproduction of 2,4,6-tri-tert-butyl phenol is effectively suppressed.

In this process there should be present from about 2 to about 5 moles of isobutylene per each mole of phenol used. This ratio is preferred from the standpoint of optimum reaction rates. However, higher amounts of isobutylene can be used (e.g. 6 to 8 moles per mole of phenol) when using temperatures approaching 160° C. Conversely, a ratio of as low as about 1.5 mole of isobutylene per mole of phenol can be used, especially at temperatures approaching 120° C.

In carrying out our process, it is essential to have present in the reaction zone one or more halogen compounds, viz. hydrogen halides, saturated organic halides or mixtures thereof. While the precise role played by this halogen compound in the mechanism of the process has not been totally established, a vast amount of experimental evidence definitely indicates that this material is not a catalyst or a catalyst promoter. Instead, its presence in the reaction zone beneficially alters the course of the reaction so that the ortho-tert-butyl phenol, 2,4-di-tert-butyl phenol and 2,6-di-tert-butyl phenol are conjointly formed in substantial quantities. This is borne out by the fact that if the halogen compound is omitted from the reaction system these three tertiary butylated phenols are not conjointly formed in substantial quantities.

Preferred halogen compounds include tertiary butyl chloride, hydrogen chloride and mixtures thereof although other hydrogen halides and saturated organic halides (e.g. tertiary butyl bromide, ethyl chloride, hydrogen bromide, propyl iodide, etc.) can be used.

The relative proportions of several of the ingredients of the reaction mixture are very important. Thus the reaction mixture of the process of this invention initially contains (a) from about 0.002 to about 0.014 gram atom of aluminum as the aluminum phenoxide catalyst per gram mole of phenol, and (b) from about 0.1 to about 3 gram moles of the halogen compound per gram atom of aluminum in the catalyst. Generally speaking, as the aluminum concentration is decreased within the foregoing range the amount of the halogen compound should be decreased within the foregoing range, although this feature is not essential to the practice of this invention. In addition, when the lower concentrations of halogen compound are used it is desirable to use temperatures approaching the upper limit described above.

The great importance of the aluminum phenoxide catalyst concentration is shown by the fact that when a process meeting all of the qualifications of the process of this invention except that a somewhat higher concentration of aluminum phenoxide catalyst was used, the reaction mixture never contained any more than 4 mole percent of 2,6-di-tert-butyl phenol. Thus in the process of this invention a relatively small amount of aluminum phenoxide catalyst must be used in order to insure the formation of an adequate amount of 2,6-di-tert-butyl phenol even though it was known heretofore (U.S. 2,831,898) that aluminum phenoxides are excellent selective catalysts for use in the preparation of 2,6-di-tert-butyl phenol. It is seen, therefore, that the process of this invention is enigmatic.

Another technical anomaly presented by our process is the fact that if the amount of halogen compound is too high (i.e. exceeds the amount specified above), the objects of this invention are not accomplished. In fact, even though larger quantities of aluminum phenoxide catalyst be used, the use of higher concentrations of halogen compound results in a mixture which is very poor in 2,6-di-tert-butyl phenol content and excessively rich in 2,4,6-tri-tert-butyl phenol content.

Practicalities demand that the reaction mixture contain at least 10 mole percent each of ortho-tert-butyl phenol, 2,4-di-tert-butyl phenol and 2,6-di-tert-butyl phenol so that these three valuable materials can be recovered without too much difficulty and without imposing a severe economic penalty upon the process or its valuable products. By the same token, an overabundance of 2,4,6-tri-tert-butyl phenol in the reaction mixture imposes a like economic penalty upon the process since it represents waste not only of valuable raw materials but of reactor throughput. Accordingly, we prefer to operate our process under the above-described conditions for a time ranging from between that time at which ortho-tert-butyl phenol, 2,4-di-tert-butyl phenol and 2,6-di-butyl phenol all become present in the reaction mixture at a concentration of at least about 10 mole percent (based upon the total phenolic compounds present in the mixture) to that time at which the mole pecentage ratio of $$\frac{Ortho\text{-}tert\text{-}butyl\ phenol + 2,4\text{-}di\text{-}tert\text{-}butyl\ phenol + 2,6\text{-}di\text{-}tert\text{-}butyl\ phenol}{2,4,6\text{-}tri\text{-}tert\text{-}butyl\ phenol}$$

no longer exceeds about 2.5. However, in situations where phenol and isobutylene raw materials are readily available at low costs this mole percentage ratio can be extended down to about 2.0 provided, however, that the three desired tertiary butylated phenols are present in the reaction mixture to absoulte molar concentrations of at least 10 percent each.

When it is desired to have the content of ortho-tert-butyl phenol predominate in the reaction product over the contents of the 2,4- and 2,6-di-tert-butyl phenols, the amount of aluminum phenoxide catalyst should generally be no higher than about 0.008 gram atom of aluminum per gram mole of phenol initially charged to the reactor. Another way of achieving this same result is to employ commercially available phenol without any special precautions of purification prior to use and to employ therewith a concentration of aluminum phenoxide catalyst ranging up as high as about 0.014 gram atom of aluminum per gram mole of such phenol initially used. Without desiring to be bound by any theoretical considerations, it is our belief that trace amounts of moisture present in most commercially available grades of phenol will deactivate a slight portion of the aluminum phenoxide catalyst so that the ortho-tert-butyl phenol content in the reaction product will predominate over the contents of the 2,4- and 2,6-di-tert-butyl phenols. Conversely, when the content of 2,4- and 2,6-di-tert-butyl phenols is intended to predominate over the ortho-tert-butyl phenol content, the amount of catalyst should be in the range of about 0.010 to about 0.014 gram atom of aluminum per gram mole of phenol initially charged to the reactor. This same effect can be achieved by using even somewhat lower concentrations of the aluminum phenoxide catalyst provided that the phenol used in the process is essentially anhydrous. It will be understood, of course, that the process of this invention should be carried out under relatively anhydrous conditions. Therefore, either the reactants and the reaction system should be kept essentially anhydrous or, where this is not possible or feasible, the reaction system should be kept essentially anhydrous and a somewhat larger quantity of aluminum phenoxide catalyst should be formed within or charged into the reaction vessel. By careful selection of the amount of catalyst so employed, a portion thereof will serve to dry up the reaction system and leave the desired concentration of aluminum phenoxide catalyst for operation in accordance with this invention.

The aluminum phenoxide catalyst used in the process of this invention can be prepared in a number of ways. One method is to react phenol directly with aluminum metal to form the aluminum phenoxide. Another method is to react phenol with an aluminum derivative of an acid which is weaker than phenol. Still another method of preparing the catalyst is to react a salt of phenol such as sodium phenoxide with a halide of aluminum such as $AlCl_3$, $AlBr_3$, etc. In short, any known process by which an aluminum phenoxide can be formed can be used in the practice of this invention. In general, we prefer to use as the catalyst a compound which initially is aluminum triphenoxide, although during the course of the reaction the chemical make-up of this phenoxide catalyst may become altered either by alkylation of one or more of the phenoxide rings by the isobutylene, or by replacement of one or more of the phenoxide rings, by a corresponding number of alkylated phenoxide groups from the alkylated phenols formed in the reaction system. Hence, if desired, the initial aluminum phenoxide catalyst may be formed from ortho-tert-butyl phenol or the like. However, when this method is employed, the alkyl substituents on the phenol should be one or more tertiary butyl groups so that the high purity of the reaction product is not impaired by the liberation of other phenolic ingredients during the process.

The catalyst can be preformed or prepared in situ. However, there are certain advantages in utilizing as in situ formed catalyst. One such advantage is that a separate reaction step becomes unnecessary and the amount of materials to form the requisite concentration of catalyst so-formed can be readily calculated beforehand. Furthermore, methods are known by which one or more of the above-described halogen compounds can be formed as a by-product during the course of the aluminum phenoxide catalyst preparation. For example, aluminum chloride can be prereacted in situ to form aluminum triphenoxide and the requisite concentration of hydrogen chloride.

This invention will be still further understood by reference to the following examples in which all parts and percentages are by weight unless otherwise specified.

EXAMPLE I

An alkylation run of this invention was conducted in a batchwise manner, employing a heated reaction vessel equipped with a stirring means and a means for introducing and withdrawing chemical reagents. During the course of the run, the vessel was heated and agitated, and samples of the reaction mixture were taken at frequent intervals and analyzed by gas chromatography to determine the nature and quantity of each component therein. In this run, the aluminum triphenoxide catalyst was present at a concentration of 0.01 gram atom of aluminum per gram mole of phenol and tertiary butyl chloride was present throughout the reaction. The concentration of chlorine corresponded to 3 gram atoms thereof per each gram mole of the aluminum catalyst. This isobutylene concentration was equivalent to approximately 4 moles thereof per each mole of phenol. During the course of the reaction, the temperature was maintained at approximately 150° C. and the pressure ranged from approximately 400 to 130 p.s.i.g. The make-up of the reaction mixture after operation for 90 minutes under the above conditions is shown in Table I.

*Table I*

PROCESS OF THIS INVENTION—PRODUCT DISTRIBUTION AFTER 90 MINUTES OF OPERATION

| Phenolic component: | Product distribution, mole percentages |
|---|---|
| 2,4-di-tert-butyl phenol | 10 |
| 2,6-di-tert-butyl phenol | 13 |
| Ortho-tert-butyl phenol | 49 |
| 2,4,6-tri-tert-butyl phenol | 4 |
| Phenol | 20 |
| Para-tert-butyl phenol | 4 |

It will be seen that at about 90 minutes each of the orthotert-butyl phenol, 2,4-di-tert-butyl phenol, and 2,6-di-tert-butyl phenol became present in the reaction mixture at a concentration of at least 10 mole percent. In addition, the mole percentage ratio of ortho-tert-butyl phenol+2,4-di-tert-butyl phenol+2,6-di-tert-butyl phenol to 2,4,6-tri-tert-butyl phenol was 18.

After 120 minutes of reaction under the above described conditions, the make-up of the reaction mixture was as shown in Table 2.

Table II
PROCESS OF THIS INVENTION—PRODUCT DISTRIBUTION AFTER 120 MINUTES OF OPERATION

| Phenolic component: | Product distribution, mole percentages |
|---|---|
| 2,4-di-tert-butyl phenol | 14 |
| 2,6-di-tert-butyl phenol | 19 |
| Ortho-tert-butyl phenol | 50 |
| 2,4,6-tri-tert-butyl phenol | 8 |
| Phenol | 6 |
| Para-tert-butyl phenol | 3 |

From the above data it is seen that the mole percentage ratio of ortho-tert-butyl phenol+2,4-di-tert-butyl phenol+2,6-di-tert-butyl to 2,4,6-tri-tert-butyl phenol was about 10.

EXAMPLE II

Another alkylation run of this invention was conducted as described in Example I with the exception that the pressure ranged from approximately 375 to 238 p.s.i.g. The make-up of the reaction mixture after operation for varying times ranging from 25 minutes to 70 minutes under the above conditions is shown in Table III.

Table III
PROCESS OF THIS INVENTION—PRODUCT DISTRIBUTION AFTER VARIOUS PERIODS OF OPERATION (25-70 MINUTES)

| Phenolic component | Product distribution, mole percentages |||||||||
|---|---|---|---|---|---|---|---|---|
| | Minutes |||||||||
| | 25 | 30 | 35 | 40 | 45 | 50 | 60 | 70 |
| 2,4-Di-tert-butyl phenol | 25 | 24 | 22 | 21 | 19 | 18 | 15 | 14 |
| 2,6-Di-tert-butyl phenol | 10 | 13 | 15 | 18 | 22 | 25 | 32 | 36 |
| Ortho-tert-butyl phenol | 33 | 33 | 33 | 32 | 30 | 28 | 21 | 16 |
| 2,4,6-Tri-tert-butyl phenol | 19 | 21 | 23 | 25 | 27 | 28 | 32 | 33 |
| Phenol | 9 | 7 | 6 | 4 | 3 | 3 | 2 | 1 |
| Para-tert-butyl phenol | 4 | 3 | 2 | 1 | 1 | 1 | nil | nil |

The data shown in Table III establish that throughout the indicated time period, the individual mole percentages of ortho-tert-butyl phenol, 2,4-di-tert-butyl phenol, and 2,6-di-tert-butyl phenol each exceeded 10 mole percent. In this run, the time period ranging from about 25 to about 50 minutes of operation constitutes a preferred embodiment of this invention since in all cases the molar percentage ratio of ortho-tert-butyl phenol+2,4-di-tert-butyl phenol+2,6-di-tert-butyl phenol to 2,4,6-tri-tert-butyl phenol was at least 2.5. The time period of from about 50 to about 70 minutes, however, comes within the purview of this invention inasmuch as the foregoing ratio during this period was at least 2.

COMPARATIVE EXAMPLE

An alkylation run not of this invention was conducted in approximately the same manner as described in Example I except for the fact that the aluminum triphenoxide catalyst concentration was somewhat higher than that used in our process. In all other respects, this run was in accordance with the procedure provided by our invention. In particular, the run was carried out in a batch-wise manner, employing a heated reaction vessel equipped with a stirring means and means for introducing and withdrawing chemical reagents. During the course of the run the vessel was heated and agitated, and samples of the reaction mixture were taken at frequent intervals over the period of 168 minutes of operation to determine the nature and quantity of each component therein. In this run the aluminum triphenoxide catalyst was present at a concentration of 0.017 gram atom of aluminum per gram mole of phenol and tertiary butyl chloride was present throughout the reaction. The concentration of chlorine corresponded to 3 gram atoms thereof per each gram mole of aluminum catalyst. The isobutylene concentration was equivalent to approximately 4 moles thereof per each mole of phenol. The temperature was maintained at approximately 150° C. throughout the reaction and during this time the pressure ranged from approximately 320 to 210 p.s.i.g. It was found that at no time during the course of the reaction did the concentration of 2,6-di-tert-butyl phenol exceed 4 mole percent based on the total phenolic content of the reaction mixture. Consequently, this run completely failed to achieve the objects of this invention.

As indicated by Examples I–II, the process of this invention can be conducted in a batchwise manner by adding all of the necessary ingredients to the reaction vessel, sealing the same, and heating the system to the requisite temperature for the appropriate period of time. It is desirable to provide for sufficient agitation of the reaction system during the process to insure thorough mixing of the various components of the system. Alternatively, the isobutylene may be fed into the reaction system in incremental portions or continuously (a semi-batch procedure) during the run.

Tertiary butylation of phenol in accordance with this invention can be conducted in a continuous manner by passing the reactants, the aluminum phenoxide catalyst and the halide compound in appropriate proportions through a reaction zone where they are subjected to the conditions of heat, pressure, and mixing necessary to accomplish the objects of this invention. In such an embodiment, any unreacted phenol or isobutylene, or both, can be recycled into the reactor.

When the reaction has reached the appropriate product distribution (either in a batch or in a continuous operation) the reaction mixture should be contacted with a sufficient quantity of water, aqueous caustic solution or aqueous acid solution to hydrolyze the catalyst and stop the reaction. To do this, the reaction mixture is usually cooled and charged to a vessel containing the water, aqueous caustic solution, or aqueous acid (e.g. HCl solution). The ortho-tert-butyl phenol, 2,4-di-tert-butyl phenol and 2,6-di-tert-butyl phenol are recovered from the resultant reaction mixture by distillation, extraction or like procedures. To effect this separation, the use of fractional distillation especially at reduced pressure is particularly desirable.

In effecting the process of this invention, it is preferred to use from about 0.005 to about 0.012 gram atom of aluminum as the aluminum phenoxide catalyst (most preferably as aluminum triphenoxide) per gram mole of phenol and from about 1 to about 3 gram atoms of the halogen (most preferably chlorine) as the halogen compound per gram mole of aluminum catalyst. In this manner, the maximum benefits characterizing this invention are achieved especially at temperatures ranging from about 140 to about 160° C. and pressures ranging from about 150 to about 500 p.s.i.g.

The use of an inert diluent is unnecessary in effecting our process although it is within the purview of our invention to use such a reaction diluent. Paraffins, cycloparaffins, and aromatic hydrocarbons are examples of suitable inert diluents which are compatible with the components of our reaction system and which, therefore, can be used for diluent purposes. If desired, an inert gas such as nitrogen, argon, helium, krypton or gaseous paraffinic hydrocarbons can be used as an inert atmosphere.

While this invention has been described with particular reference to the alkylation of phenol with isobutylene, it will be understood that the principles of operation herein described can be applied very successfully to the alkylation of other phenols such as meta-cresol, ortho-tert-butyl phenol, ortho-isopropyl phenol, and the like. Furthermore, it is within the ambit of this invention to apply our novel principles of operation to the alkylation of phenol or other phenolic compounds (such as those just described) using propylene or the various pentenes, hexenes, heptenes, octenes, etc. which are normally applicable for use as reactants in phenol alkylation procedures. Generally speaking, the reaction conditions described herein are directly translatable to effecting such other processes. Any slight modifications which may be desirable will, of course, now be apparent to one skilled in the art.

We claim:

1. A process for the conjoint preparation of ortho-tert-butyl phenol, 2,4-di-tert-butyl phenol and 2,6-di-tert-butyl phenol characterized by
    subjecting a reaction mixture composed of phenol, isobutylene, an aluminum phenoxide catalyst
    and a halogen compound, as hereinafter defined, to a
    temperature of from about 120 to about 160° C., and to a
    pressure of from about 100 to about 900 p.s.i.g. for a period of time ranging from that
        (a) time at which each of ortho-tert-butyl phenol, 2,4-di-tert-butyl phenol, and 2,6-di-tert-butyl phenol becomes present in the reaction mixture a concentration of at least about 10 mole percent based on the total phenolic compounds present in said mixture, to that
        (b) time at which the mole percentage ratio of $$\frac{\text{ortho-tert-butyl phenol} + 2,4\text{-di-tert-butyl phenol} + 2,6\text{-di-tert-butyl phenol}}{2,4,6\text{-tri-tert-butyl phenol}}$$

no longer exceeds about 2.0;
said halogen compound being selected from the group consisting of hydrogen halides, alkyl halides having 1 to 4 carbon atoms per alkyl group, and mixtures thereof; said halides being selected from the group consisting of chlorine, bromine and iodine;
    said reaction mixture initially containing
        (a) from about 0.002 to about 0.014 gram atom of aluminum as said catalyst per gram mole of phenol and
        (b) from about 0.1 to about 3 gram moles of said halogen compound per gram atom of aluminum as said catalyst.

2. The process of claim 1 wherein said catalyst initially is predominantly aluminum triphenoxide.

3. The process of claim 1 wherein said halogen compound consists essentially of tertiary butyl chloride.

4. The process of claim 1 wherein said halogen compound consists essentially of hydrogen chloride.

5. The process of claim 1 wherein said catalyst initially is predominantly aluminum triphenoxide and said halogen compound consists essentially of tertiary butyl chloride.

6. The process of claim 1, wherein said catalyst initially is predominantly aluminum triphenoxide and said halogen compound consists essentially of hydrogen chloride.

7. The process of claim 1 wherein said aluminum phenoxide catalyst is formed in situ.

8. The process of claim 1 wherein the isobutylene is used in an amount of from about 2 to about 5 moles per each mole of phenol.

9. The process of claim 1 wherein the temperature is in the range of about 140 to about 160° C. and the pressure is in the range of about 150 to about 500 p.s.i.g.

10. The process of claim 1 wherein the mole percentage ratio of $$\frac{\text{ortho-tert-butyl phenol} + 2,4\text{-di-tert-butyl phenol} + 2,6\text{-di-tert-butyl phenol}}{2,4,6\text{-tri-tert-butyl phenol}}$$

does not exceed about 2.5

11. The process of claim 10 wherein said catalyst initially is predominantly aluminum triphenoxide.

12. The process of claim 10 wherein said catalyst initially is predominantly aluminum triphenoxide and said halogen compound consists essentially of tertiary butyl chloride.

References Cited in the file of this patent

UNITED STATES PATENTS 2,931,898    Ecke et al.    Apr. 22, 1958

FOREIGN PATENTS 1,044,825    Germany    Nov. 27, 1958